United States Patent

[11] 3,590,473

| [72] | Inventor | Gilbert Fritz Carlson<br>Skokie, Ill. |
|---|---|---|
| [21] | Appl. No. | 718,295 |
| [22] | Filed | Mar. 14, 1968 |
| [45] | Patented | July 6, 1971 |
| [73] | Assignee | International Telephone & Telegraph Corporation<br>New York, N.Y. |

[54] METHOD OF MANUFACTURING HYDRAULIC VALVE WITH FLUID METER CONNECTIONS
7 Claims, 4 Drawing Figs.

[52] U.S. Cl. ................................................ 29/157.1,
29/445, 73/3, 73/212, 137/625.29
[51] Int. Cl. ............................................. B21d 53/00,
B21k 29/00, B23p 15/26
[50] Field of Search........................................... 29/157.1,
445; 73/3, 212; 137/625.28, 625.29, 625.3

[56] References Cited
UNITED STATES PATENTS
| 1,456,942 | 5/1923 | Smith | 73/3 |
|---|---|---|---|
| 2,133,742 | 10/1938 | Forbes | 29/157.1 X |
| 2,140,562 | 12/1938 | Snow | 73/3 |
| 2,525,831 | 10/1950 | Scherer | 29/157.1 X |
| 3,172,192 | 3/1965 | Dresden | 29/157.1 |

FOREIGN PATENTS
| 667,517 | 7/1963 | Canada | 29/157.1 |

Primary Examiner—John F. Campbell
Assistant Examiner—Victor A. D. Palma
Attorneys—C. Cornell Remsen, Jr., Rayson P. Morris, Percy P. Lantzy, J. Warren Whitesel and Delbert P. Warner ABSTRACT: The rotor in a square cock head valve has the usual main fluid passage. In addition, it also has upstream and downstream orifices communicatingly connectably to a meter attachment point on the valve rotor. This way, a meter may be attached or removed by merely closing the main valve. There is no need to provide pressure tapping valves for controlling the flow of fluids when the meter is attached to or removed from its connections with the housing. When the meter is not attached, nonleaking plugs seal off the valve.

PATENTED JUL 6 1971
3,590,473
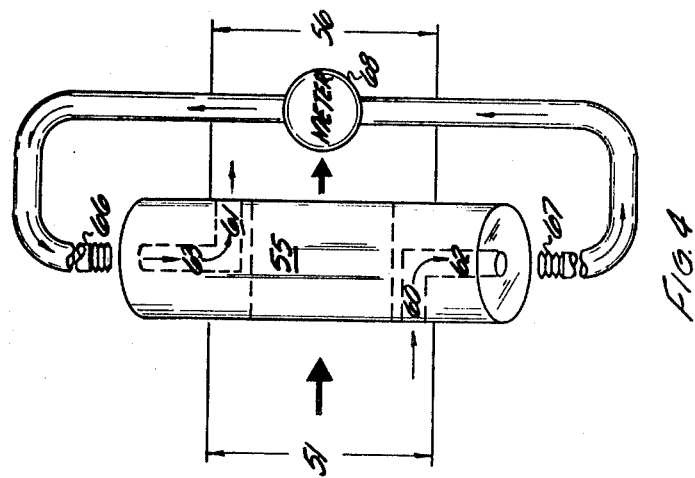
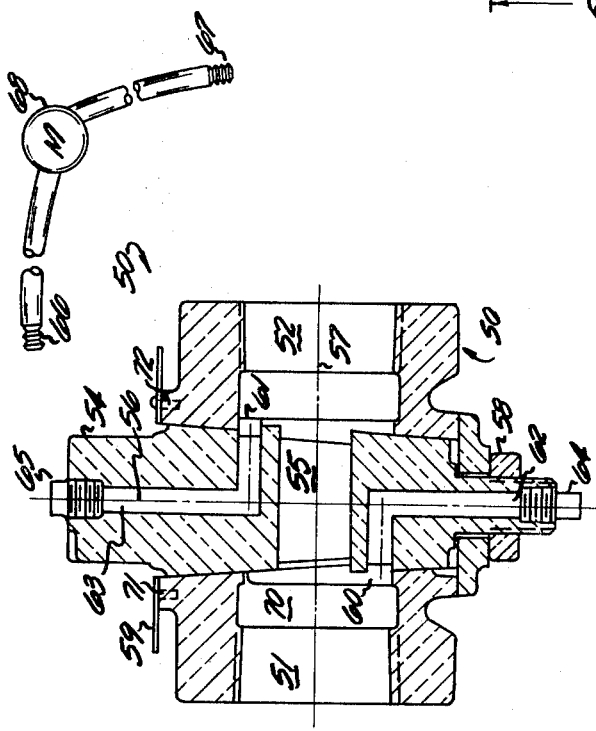
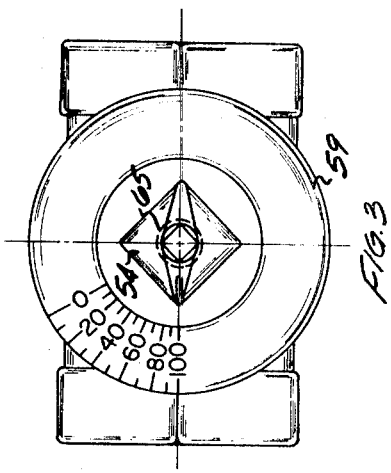
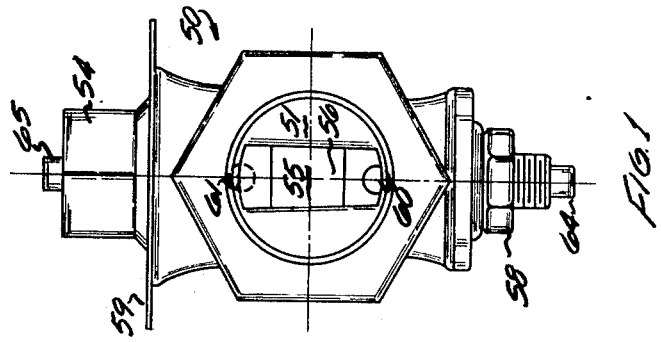
INVENTOR
G.F. CARLSON
BY
ATTORNEY

METHOD OF MANUFACTURING HYDRAULIC VALVE WITH FLUID METER CONNECTIONS

This invention relates to square cock valves and more particularly to hydraulic valves having means for connecting meters thereto.

While the principles of the invention may find application in connection with many different types of valves, it has particular utility in stopcock valves, generally, and more particularly squarehead cock valves. As used herein, the term "cock valve" describes a housing adapted for a series connection in a pipe. The housing has a cylindrical or rotor member mounted therein for rotation about an axis perpendicular to the axis of the pipe. A passage pierces the cylinder or rotor so that a fluid may flow through the pipe if the rotor is turned to a position wherein the fluid passage is coincident with the bore of the pipe. However, if the rotor is turned by approximately 90°, its fluid passage is perpendicular to the bore of the pipe, and fluid cannot flow through it.

The valve described thus far is very well known, having been used virtually unchanged for many centuries. Probably this long and unchanged usage is a tribute to the economy and efficiency of the valve. It is very well suited to its intended purpose. However, the environment in which these valves are used is changing relatively fast, and they sometimes fail to function properly in newer hydraulic systems.

Primarily, these changes relate to a need for precisely regulating the amount of fluid flowing through a pipe. It is no longer enough merely to allow or stop the flow of a fluid. It is also necessary for a user to control the flow to enable a precise amount of fluid to pass through the valve during an incremental period of time. Therefore, the problem is to provide some means by which the user may accurately turn the valve to any desired setting. But, this means must be provided without substantially increasing the cost of the valve. Otherwise, the chief advantage of the square head cock valve is lost.

Accordingly, an object of the invention is to provide new and improved valves. More particularly, an object is to provide a stopcock valve which may be set at will to enable the flow of a precisely measured amount of fluid per unit of time. Here, an object is to provide a stop cock valve calibrated in terms of percentage of orifice opened or closed. In this connection, an object is to accomplish these ends without substantially increasing the cost of the conventional stopcock valve.

Another object of the invention is to provide an adjustable stopcock valve which may be manufactured on readily available, low cost, general purpose machines. Another object is to provide a valve which can be manufactured in high volume and at a low cost as compared with other valves having similar functions. In particular, an object is to provide such a valve which can be used in connection with a meter without requiring special pressure tapping valves.

Yet another object is to provide a low cost method of valve manufacture which, nevertheless, enables a high degree of precision not readily available on even the finest quality valve. Here an object is to provide a simple and low cost method of converting readily available, mass produced valves into precision valves. More particularly, an object is to provide valves having accurately sized and precisely registered rotor and housing orifices.

In keeping with an aspect of the invention, these and other objects are accomplished by means of pressure tapping orifices formed in a square head cock rotor and connected to the exterior of the valve by means of passages through the axis of the rotor. Depending upon the hydraulic system needs, the tapping orifice may be arranged to present a variable fluid pressure from the pipe to the meter while the rotor is in any predetermined position relative to the fluid passage valving positions. Further, nonleakage plugs may be used to close off the tapping orifice at the exterior of the valve. Removal of these plugs enables the connection of a meter to the rotor. In this manner, the rotor may be turned to a closed position to cutoff the fluid passage between the tapping orifice and the meter. Then, the nonleakage plugs may be removed, and the meter may be attached to the valve. Thereafter, the rotor may be turned to any position which allows the fluid pressure in the pipe to reach the meter. The pressure differential between the upstream and downstream fluid may be read on the meter as a result of the fluid flowing from the pipe and through the pressure tapping orifices to the meter. No balance or pressure tapping valves are required; the control over an application of fluid pressure to the meter occurs within the valve body and responsive to a rotation of the rotor.

The above mentioned and other features and objects of this invention and the manner of obtaining them will become more apparent, and the invention itself will be best understood by reference to the following description of an embodiment of the invention taken in conjunction with the accompanying drawings, in which:

FIG. 1 is a plan view looking into the input orifice of a valve incorporating the principles of the invention;

FIG. 2 is a cross-sectional view of the inventive valve taken at right angles to the valve of FIG. 1;

FIG. 3 is a plan view of the valve of FIG. 1 looking down toward the top of the valve; and FIG. 4 is a schematic view of the rotor showing how the flow meter is attached.

The valve includes a body 50 having inlet and outlet orifices 51, 52, respectively. Preferably the housing is a cast, metal part. Mounted in the pipe formed by and around the orifices is a tapered somewhat cylindrically shaped rotor 54 pierced by a fluid passage 55. The rotor is journaled to turn about an axis 56 which is perpendicular to the axis 57 of the pipe. The fluid passage 55 is coincident with the bore of the pipe when the rotor is in the open position shown in FIGS. 1 and 2. If the rotor 54 is turned by 90° to a closed position, the fluid passage is crossways and perpendicular to the bore of the pipe. This way the valve either passes or blocks the flow of fluid in the pipe depending upon the position of the rotor.

According to a principle of the invention, the fluid passage through the rotor is shaped so that it may be placed in any metered position in order to establish a two stage pressure reduction. The percentage opening of the valve may be calibrated by observing a reading on a flow meter while the valve is in many different rotary positions. Thereafter, the valve may again be set to these same calibrated positions with an assurance that the percentage of the openings will be the same. Also, the rotor is provided with meter fittings which are controlled by the rotor position. This way, it becomes possible to modify a conventional square head cock to become a balanced valve, to provide a contoured orifice, and to use (or not use) a meter——all without requiring any pressure tap valves.

In greater detail, the rotor 54 is cast in the general form shown in FIG. 2 with a taper and a fluid passage 55. After the rotor is cast, the fluid passage opening 55 is machined, in any suitable manner, (as by broaching, drilling, etc., for example) to have a contour with a precision size and shape. The bottom of the rotor is threaded, and a meter connection is tapped. The rotor is then inserted into the housing 50, and a nut 58 is attached to the threads on the bottom of the rotor 54 to secure it in place for rotary motion. Also, a calibration dial 59 is attached to the top of the valve housing 50.

In addition to the fluid passage 55, the rotor 54 has oppositely disposed, pressure tapping orifices 60, 61 which face upstream and downstream, respectively. Communicating between these orifices and the outside of the valve are the conduits 62, 63 which are coaxial with the center line of the rotor. The outer ends of these conduits are tapped to have internal threads. Non leaking plugs 64, 65 are then turned into these threaded openings. When these plugs are in place (as shown in FIG. 2) no fluid may leak from inside the valve to the outside of the valve. On the other hand, when the plugs 64, 65, are removed, the threaded ends 66, 67 of pipes leading to a meter 68 may be joined to the conduits 62, 63. In this way, the valve may be turned to an off position, and either the meter 68 or the plugs 64, 65 may be removed or inserted without leakage. The valve may then be turned by any suitable amount to an on position. If the meter is connected in the fluid circuit, it indicates the difference in pressure at 51 and 52.

The described arrangement is very flexible. On one hand, no pressure tapping valves are required because the meter may be attached or removed simply by opening or closing the main valve. Thus, the cost of the pressure tapping valves may be eliminated, and this is a substantial savings as compared with the low cost of very simple cock valves of smaller sizes. On the other hand, some larger valves or the means for operating these valves could be fairly expensive as compared with the cost of the pressure tapping valves. For example, sometimes the need for setting a valve precisely is so important that the valve should not be closed after it has been set. Here the added cost of pressure tapping valves is insignificant. In these and other cases, pressure tapping valves may be interposed between the passages 62, 63 and the nonleaking plugs 64, 65.

The invention is not particularly concerned with the nature of the meter. Any known device may be used as long as it measures the pressure differential appearing across the valve. For example, one known device includes a diaphragm which is flexed one way or the other responsive to the pressure differential on either side of it. A needle coupled to the diaphragm indicates the pressure differential across the valve as indicated by the degree of flexing. Another known device includes a small turbine propeller or impeller which turns as a function of the flow of fluid, which, in turn, varies in rate as a function of pressure differentials. Still another arrangement utilizes two entirely separate devices which separately display the upstream and downstream pressures. Still other suitable devices will readily occur to those who are skilled in the art.

Since the pressure differential varies as a function of the percentage of the opening at the valve fluid passage orifice 55, the reading on the meter 68 directly indicates the percentage of the opening. Thus, a valve may be manufactured, a meter may be attached, and the calibration dial 59 may be either adjusted or marked to indicate the percentage of the orifice opening. After the valve is completely calibrated, the meter 68 may be removed, and the plugs 64, 65 reinstalled to make the valve nonleaking. Since many valves may be machined to the same precise dimensions, it is not necessary to calibrate each and every valve. Rather a valve type may be calibrated and an accurate dial may be made. Thereafter, it is only necessary to adjust the dial on a finished valve.

Further sophistications are possible. For example, the orifice in the rotor may be given a special contour to enable a faster or slower response per unit of revolution. Thus, in FIG. 1, the drawing shows a somewhat truncated triangular shaped opening. This way, the orifice will open slowly, and fluid will flow first at the widest part of the opening, near the base of the truncated triangle. As the orifice opens wider, the full altitude of the truncated triangle comes into the opening and there is a faster response. In a similar manner, the contour of opening 55 may have any suitable shape.

The inventive method of manufacture lends itself to quantity production of high quality precision devices at very low cost. In great detail, the valve shown in FIGS. 1 and 2 is readily available on the open market at very low cost. All tools and machinery required to make it are very well known and depreciable over large quantity production. Thus, a manufacturer may either buy or make these valves at the lowest possible cost.

Then, the rotor in the valve is turned to the open position and placed in a jig suitably associated with a machine tool. That machine has a long broach which is pushed through both the orifice 55 and the end wall 70 which terminates the passage way 51. The broach may also pass through another end wall (similar to 70) which terminates the passage 52. This way, the broach makes the two openings at 70 and 55 in an absolutely accurate alignment within the precision tolerances built into the broaching process. With the housing and rotor orifices aligned, an index forming step occurs. For example, two drills may come in and drill holes 71, 72 in the housing 50. Regardless of the minor misalignments which may or may not have been made when the valve was placed in a jig for broaching, the holes 71, 72 are precisely located with respect to the broached orifices at 55 and 70. Therefore, if the dial 59 is accurately made so that its scale is precisely located with respect to two holes drilled in it, the valve may be accurately set by turning the rotor to a position indicated on the scale.

While the principles of the invention have been described above in connection with specific apparatus and applications, it is to be understood that this description is made only by way of example and not as a limitation on the scope of the invention.

I claim:

1. A method of manufacturing a fluid valve, said fluid valve including a valve body having inlet and outlet orifices, comprising the steps of forming a square cock rotor having a fluid passage opening and a pair of pressure tapping openings, machining said openings to predetermined contours, assembling said square cock rotor in said valve body, attaching a meter to said pressure tapping openings while said valve is in a closed position, and calibrating said valve capacity responsive to meter readings while said rotor is in a number of different positions.

2. The method of claim 1 and the steps of removing said meter while said valve is in a closed position, and sealing said pressure tapping openings.

3. A method of manufacturing valves comprising the steps of (A) casting a housing having a first passage way therein, (B) casting a rotor having a second passage way therein for controlling a flow through said housing, (C) assembling said rotor in said housing and (D) machining said two passage ways to form a precisely shaped opening through said valve.

4. The method of claim 3 and the step of aligning said two passage ways before said machining whereby said machining shapes said two passage ways simultaneously thus assuring registration of these openings.

5. The method of claim 4 wherein said machining step includes running a broaching means through said housing and said rotor simultaneously.

6. The method of claim 5 wherein said machining step includes forming an index on said valve while said parts are aligned for said broaching.

7. The method of claim 6 and the step of aligning a calibration scale with said indexing means.